United States Patent [19]

Premru et al.

[11] 3,718,832

[45] Feb. 27, 1973

[54] APPARATUS FOR PRODUCING RAMP SIGNALS AND AN INTENSITY CONTROL SIGNAL IN RESPONSE TO DIGITAL DATA, PARTICULARLY FOR A CRT VECTOR GENERATOR

[75] Inventors: Brian Allan Premru, Ridgefield, Conn.; James H. Nash, Jr., Hawthorne, N.Y.

[73] Assignee: Information Displays, Inc., Mt. Kisco, N.Y.

[22] Filed: Aug. 21, 1970

[21] Appl. No.: 65,779

[52] U.S. Cl. ........................................315/18, 315/22

[51] Int. Cl. ................................................H01j 29/70

[58] Field of Search ................315/18, 22; 340/324 A

[56] References Cited

UNITED STATES PATENTS

| | | | |
|---|---|---|---|
| 3,544,835 | 12/1970 | Nielsen | 315/22 |
| 3,588,871 | 6/1971 | Shiosaki | 315/18 |

*Primary Examiner*—Carl D. Quarforth
*Assistant Examiner*—J. M. Potenza
*Attorney*—Pennie, Edmonds, Morton, Taylor and Adams

[57] ABSTRACT

A vector generator is described operating on a constant writing speed basis for larger vectors and on a constant time basis for small vectors. The generator utilizes X,Y. ΔX, ΔY and ΔMax digital data, ΔMax being the greater in magnitude of ΔX and ΔY. A feedback control amplifier supplied with a constant input signal has two feedback loops. One loop includes a D/A attenuator supplied with ΔMax and the other includes a bias source which limits the output to a predetermined value for small values of ΔMax. The output of the D/A attenuator is used to produce an intensity control signal which varies with vector length in the region where limiting takes place. The control amplifier output is fed to a difference amplifier having a transistor-controlled feedback circuit to produce a current accurately proportional to the control amplifier output, and another transistor having an input circuit like that of the feedback transistor and supplied with the same input supplies charging current to a ramp capacitor. The ramp signal is compared with a reference to produce a ramp stop signal. Ramp start and stop signals are delayed and gate the intensity control signal, and the delayed stop signal is used to terminate the ramp rise. The ramp signals are supplied to D/A amplifiers controlled by the ΔX and ΔY digital data to produce CRT deflection waves.

13 Claims, 11 Drawing Figures

INVENTORS
BRIAN A. PREMRU
JAMES H. NASH, JR.

BY

Bonnie Edwards Morton Taylor & Adams

ATTORNEYS

INVENTORS
BRIAN A. PREMRU
JAMES H. NASH, JR.
BY
Pennie Edmonds Morton Taylor & Adams
ATTORNEYS

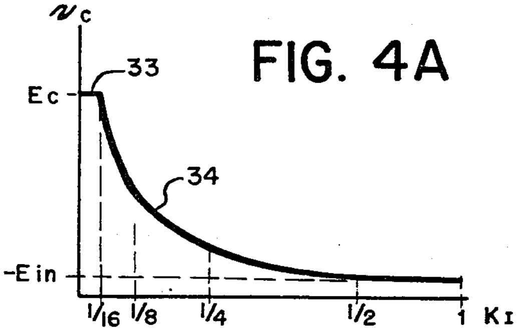
FIG. 4A
FIG. 5
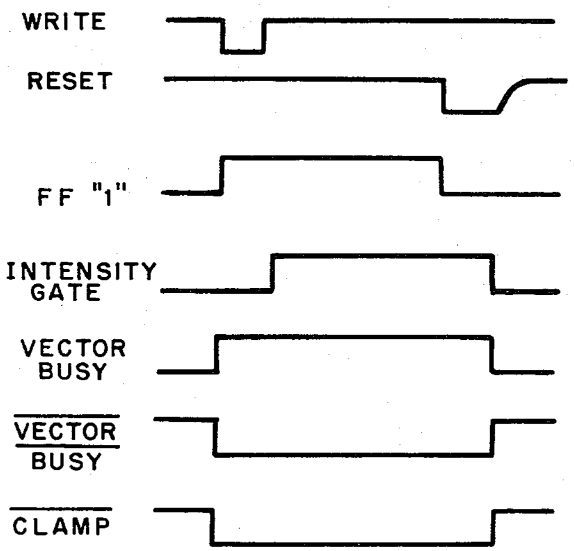
FIG. 4B
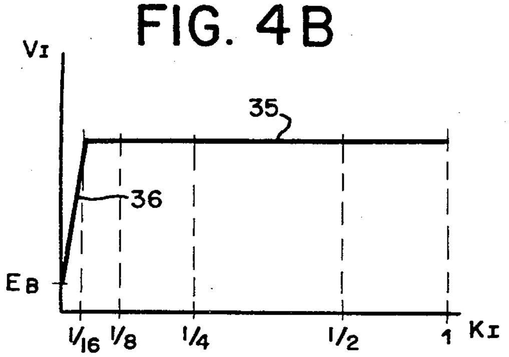
FIG. 7
FIG. 6
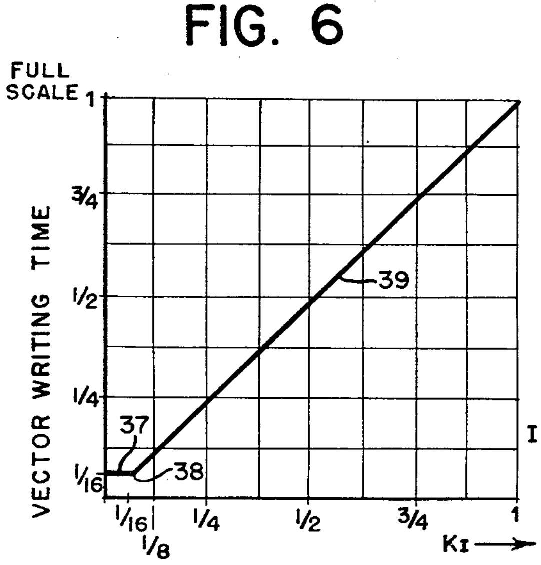
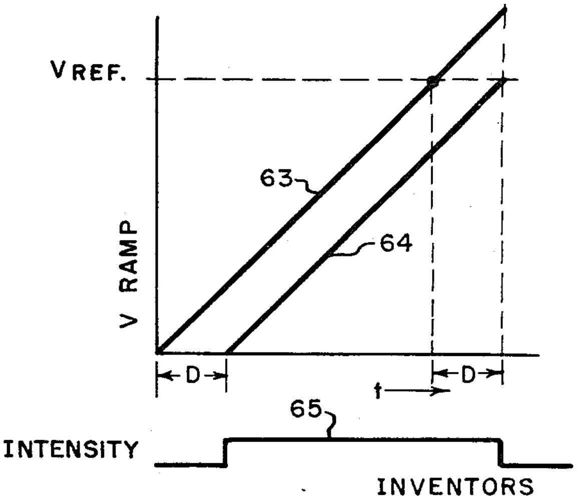
INVENTORS
BRIAN A. PREMRU
JAMES H. NASH, JR.
BY
Brumbaugh Edmonds Morton Taylor & Adams
ATTORNEYS

APPARATUS FOR PRODUCING RAMP SIGNALS AND AN INTENSITY CONTROL SIGNAL IN RESPONSE TO DIGITAL DATA, PARTICULARLY FOR A CRT VECTOR GENERATOR

BACKGROUND OF THE INVENTION

Vector generators for writing vectors on the face of a cathode-ray tube (CRT) in response to digital data are now well known. Such data may be produced by a computer, a character generator, etc. The digital data may specify, or be converted to specify, the X and Y starting points of the desired vectors and the incremental values thereof, Δ X and Δ Y. The digital data is then used to produce corresponding deflection signals for the CRT by suitable digital-to-analog (D/A) apparatus.

Such vector generators may function on a constant time basis, that is, each vector may be drawn in approximately the same time regardless of its length. This procedure is wasteful of time, particularly when many short vectors are to be drawn, since the time required to draw a full scale vector is controlling and conventional CRT deflection circuits impose a limit on the speed with which the CRT beam may be deflected. Also, since the writing speed varies with vector length, intensity control of the CRT display is required in order to keep all lines of approximately equal brightness. For example, to maintain a constant intensity-to-writing speed ratio, an intensity variation of 1,000:1 may be required to maintain equal brightness for the longest and shortest vectors to be drawn.

Vector generators operating on an approximately constant writing speed basis have also been proposed, so as to save time in writing short vectors and to avoid the need for intensity control. One such system adds the Δ X and Δ Y components in order to generate a ramp voltage which is thereafter applied to D/A converters to produce the deflection waves. In such a system a vector at an angle takes more time to draw than horizontal or vertical vectors, by a factor of two in the case of a 45° vector with a 1:1 aspect ratio.

Even with a constant writing speed, high speed circuitry is important in order to conserve the time required for complicated displays. Also, accuracy in generating the vectors is important, in order to avoid distortion of the display. In addition, if constant-amplitude ramps are used to produce approximately constant writing speed deflection waves, the slope of the ramp becomes very steep for short vectors and should theoretically be infinite for a dot. Such ramps are difficult to generate.

SUMMARY OF THE INVENTION

The present invention is directed particularly to a vector generator operating at a substantially constant writing speed throughout most of its range, and capable of very high speed operation. Although particularly directed to a vector generator, certain features of the invention may have broader application.

A constant-amplitude variable-slope ramp generator is provided in which the maximum slope for short vectors is limited to a predetermined value, so that short vectors are drawn on a constant time basis whereas longer vectors are drawn on an approximately constant writing speed basis. In the constant time range the writing speed varies, and an intensity control signal is produced by the same circuit which controls the ramp slope. This is highly advantageous since it greatly facilitates circuit design and inherently maintains proper transition points for both ramp slope and intensity control, thereby insuring a satisfactorily constant intensity-to-writing speed ratio.

In order to obtain an approximately constant writing speed without increasing the time for writing vectors at an angle, the ramp slope is controlled by a signal Δ Max, which is the greater in magnitude of the Δ X and Δ Y components.

To produce a ramp slope control signal, a feedback amplifier is employed. One feedback loop includes a D/A attenuator supplied with Δ Max digital data and yields a feedback signal which is proportional to a fraction of the amplifier output signal. A constant signal of selected value is applied to the amplifier input so that the output increases as the fraction decreases. The amplifier output is limited to a predetermined value for small fractional outputs of the D/A attenuator. Advantageously this limiting is produced by a second feedback loop which includes a bias source in opposition to the amplifier output, together with a switching or threshold device, which prevents feedback when the output is below the predetermined value but allows feedback when the output reaches that value. The control amplifier output is supplied to a ramp generator which generates ramps whose slopes are controlled by the magnitude of the amplifier output.

In the proportional time range, the output of the D/A attenuator in the feedback loop is constant regardless of Δ Max. However, in the constant time range where limiting is present, the output of the D/A attenuator decreases as Δ Max decreases. This output is used to control the intensity of the CRT display so that all vectors are of approximately equal brightness.

The ramp generator employs a transistor differential amplifier with a feedback transistor arranged to give a feedback current accurately proportional to the input signal from the control amplifier. A ramp charging transistor having a characteristic and an input-circuit like that of the feedback transistor is supplied with the same input signal so as to yield an output current which is the same as that of the feedback transistor, but allows the output circuit to be open-ended and function independently without affecting the feedback circuit. The current from the ramp charging transistor is used to charge a ramp capacitor. The differential amplifier has a common emitter circuit designed to minimize voltage offset.

When the ramp voltage equals a reference voltage, a comparator produces a stop signal which is utilized to stop further charging of the ramp capacitor, and to discharge the capacitor. Advantageously, in the discharge condition current in the output circuit of the ramp charging transistor is diverted to a shunt transistor so as to eliminate any voltage drop in the discharge device and thereby eliminate any offset voltage at the beginning of the next ramp. This enables very accurate starting ramp voltages to be obtained.

With a magnetically deflected CRT display there is a slight delay between application of voltage to the deflection coils and the start of the actual sweep, and there may be small propagation delays. In accordance with a further feature of the invention a delay is introduced between the development of the ramp voltage and the intensification of the CRT beam, and the ramp voltage is allowed to rise above the reference voltage so as to continue sweep generation in the delay interval. Delayed start and stop signals are produced from the initial start and stop signals, and are used to gate the intensity control signal to the CRT so that intensification coincides with the actual sweep producing the vector. The initial start and delayed stop signals are utilized to control the ramp generation.

BRIEF DESCRIPTION OF THE DRAWINGS

FIGS. 4A and 4B are graphs applicable to FIG. 3;

FIG. 5 shows various control waveforms applicable to FIG. 3;

FIG. 6 is a graph showing vector writing time applicable to FIGS. 1 and 3; and FIG. 7 is explanatory of the delayed sweep and intensity control.

DESCRIPTION OF THE SPECIFIC EMBODIMENT

Figure 1:
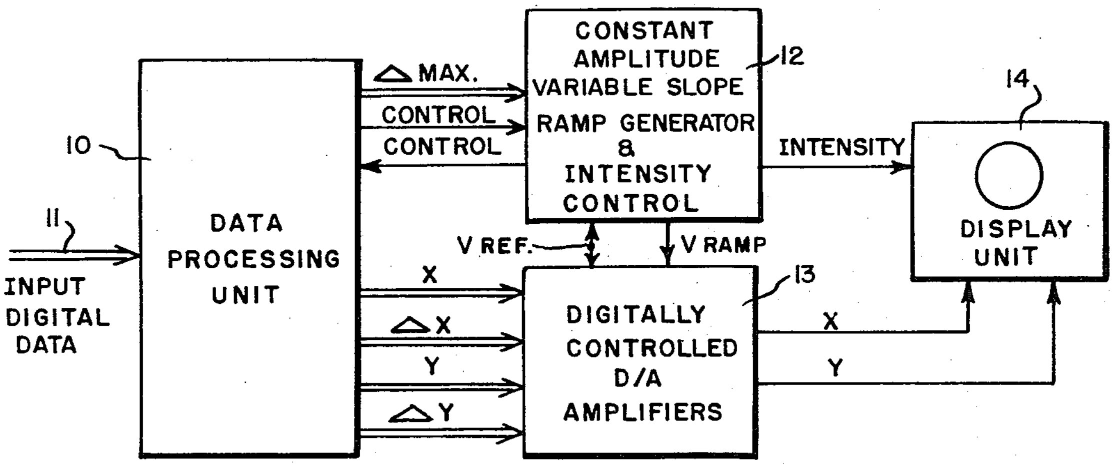
FIG. 1 is a block diagram of a vector display system in which the invention is used.

Referring to FIG. 1, a Data Processing Unit 10 (DPU) receives input digital data from lines 11 specifying the vectors desired to be displayed. The input digital data will commonly be in binary form and may be supplied by a computer, a character generator, etc. The DPU provides digitally coded outputs X and Y to designate the starting point of a given vector. It also supplies digitally coded outputs Δ X and Δ Y which designate the incremental values to be added to the initial values in order to draw the vector. In addition, the DPU also determines the greater of the magnitudes of Δ X and Δ Y and supplies a corresponding digitally coded output Δ Max.

The Δ Max output is supplied to block 12 containing a constant amplitude, variable-slope ramp generator and intensity control circuits. The ramp generator in block 12 utilizes the Δ Max digital input and a reference volage designated $V_{REF}$ to generate the output $V_{RAMP}$ which is supplied to block 13 containing digitally controlled digital-to-analog (D/A) amplifiers. Suitable control lines interconnect the DPU and block 12 so that the ramps are generated at the proper times and with as little delay as possible between ramps for successive vectors to be displayed.

The D/A amplifiers in block 13 receive the X,Y and Δ X and Δ Y digital inputs, along with the ramp voltage and reference voltage, and develop suitable *x* and *y* analog deflection signals which are supplied to display unit 14. Display unit 14 is commonly a cathode-ray tube having suitable deflection circuits and an intensity control. An intensity signal is supplied from block 12 to the display unit.

Figure 2A:
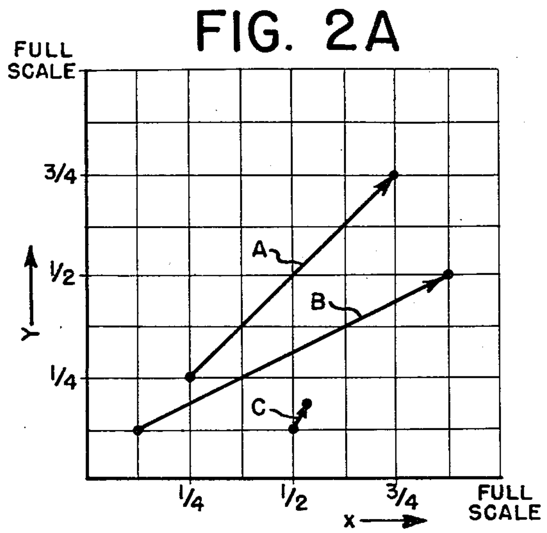
FIGS. 2A–2D are graphs explaining the generation of deflection waves.

Referring to FIG. 2, FIG. 2A represents the face of the display such as the face of a cathode-ray tube. Three vectors designated A, B and C are shown. It will be understood that these are not generated simultaneously, and are shown for illustrative purposes.

Figure 2B:
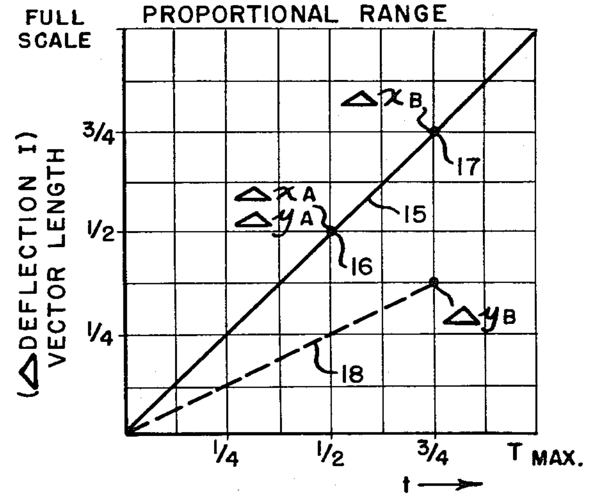

As mentioned hereinbefore, all except very short vectors are drawn at a fairly constant writing speed, whereas very short vectors are drawn in a constant writing time. Vector A is illustrated as a 45° vector having a starting point at $x,y = 1/4$ full scale deflection and an end point equal to $x,y = 3/4$ full scale deflection. FIG. 2B shows a plot of vector length versus time, wherein the straight line 15 shows a full scale vector length drawn in a time $T_{max}$. $T_{max}$ is advantageously selected to correspond to the shortest time within which a full scale vector may be drawn, taking into account the deflection capabilities of the display unit and the speed with which the processing circuits are capable of operating. Inasmuch as vector A is one-half full scale in both *x* and *y* directions, it may be drawn in a time equal to $1/2\ T_{max}$ as indicated by point 16.

Referring back to FIG. 2A, vector B is shown with a starting point at $x,y =$ one-eighth full scale and an end point at $x = 7/8$ and $y = 1/2$ full scale. This yields $\Delta x = 3/4$ full scale, and $\Delta y = 3/8$ full scale. In FIG. 2B, the point 17 corresponds to $\Delta x_B$. Inasmuch as the component $\Delta y_B$ must be drawn in the same time as $\Delta x_B$ in order to produce a straight line vector, the slope of the *y* deflection wave will be less, as indicated by dash line 18.

Figure 2C:
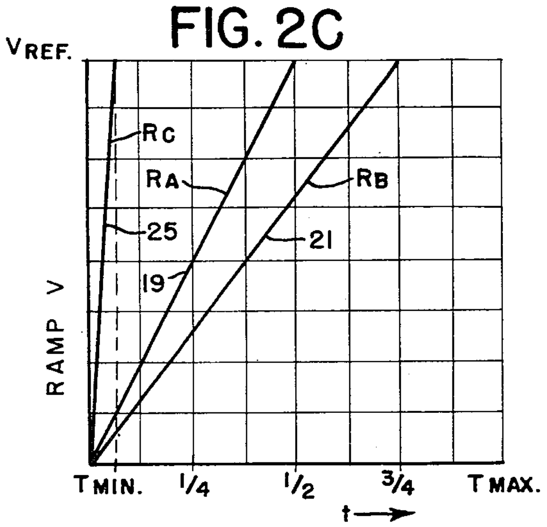

Referring to FIG. 2C, ramp voltage is plotted against time. The ramp voltage is of constant amplitude and extends from zero to approximately $V_{REF}$. Actually, as explained hereinafter, the ramp voltage extends somewhat above $V_{REF}$ due to a delay in starting the CRT sweep, but this will be disregarded for the moment. In order to secure an approximately uniform writing speed, the slope of the ramp voltage varies, depending on the value of Δ Max which in turn is the greater of $|\Delta x|$ or $|\Delta y|$. For vector A, both $\Delta x$ and $\Delta y$ are the same, and either may be used to control the generation of the ramp voltage. Since they are equal to one-half full scale, line 19 shows the ramp voltage for vector A, designated $R_A$, as rising to $V_{REF}$ in $1/2\ T_{max}$. For vector B, $\Delta x$ is greater and is equal to three-fourths full scale. Consequently, line 21 for $R_B$ rises to $V_{REF}$ in $3/4\ T_{max}$.

As will be noted, the times required to draw vectors A and B are approximately proportional to their lengths. The actual writing speeds along the vectors will depend to some degree on the vector angles, inasmuch as the time is determined by the maximum of the *x* and *y* incremental components. If the vector to be drawn were either horizontal or vertical, the writing speed would be $T_{max}$ divided by full scale deflection in inches. However, with vectors at an angle, the writing speed is somewhat greater although the writing time is still accurately proportional to $\Delta_{max}$. Vector A at 45° illustrates the limiting case wherein the writing speed is $\sqrt{2}$ times the $\Delta x$ speed. For vector B, at a smaller angle, the writing speed will be more nearly that of $\Delta x$. Note that the writing speeds for vectors at an angle are greater than for horizontal or vertical vectors, and that no additional time is required for writing such vectors.

As the vectors become shorter, the slope of the ramp voltage in FIG. 2C becomes greater. To avoid the need for generating excessively steep ramps, for very short vectors a constant deflection time is employed. The transition from proportional range to constant time range may be selected as meets the judgment of the designer, and in this example is selected as one-sixteenth full scale.

Figure 2D:
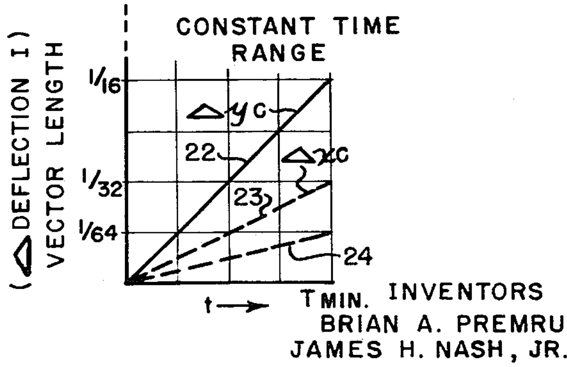

Vector C in FIG. 2A is drawn as $\Delta x = 1/32$ full scale and $\Delta y = 1/16$ full scale. FIG. 2D shows a plot of vector length versus time in the constant time range. $T_{Min}$ designates the time selected for drawing these vectors and is the appropriate fraction of $T_{max}$ in FIG. 2B, here one-sixteenth of $T_{max}$. Line 22 shows the incremental *y* component of the vector, designated $\Delta y_c$. Inasmuch as $\Delta x$ is ½ $\Delta y$, the dash line 23 shows the $\Delta x_c$ vector component. The corresponding ramp voltage $R_C$ is shown in FIG. 2C and it will be observed that it rises to $V_{REF}$ in time T, here selected as 1/16 $T_{max}$. For shorter vectors wherein the maximum component is as shown by dot-dash line 24 in FIG. 2D, the ramp voltage would be the same as shown at 25 in FIG. 2C.

The ramp voltages such as shown in FIG. 2C are supplied to block 13 in FIG. 1 which contains digitally controlled D/A amplifiers which are supplied respectively with the digital values of X,Y and Δ X, Δ Y. The block is also supplied with reference voltage $V_{REF}$. For the starting points of the vectors in FIG. 2A, the X and Y inputs to respective D/A amplifiers select the appropriate proportions of $V_{REF}$. Similarly, the Δ X and Δ Y D/A amplifiers select appropriate proportions of the ramp voltage in accordance with the digital Δ X and Δ Y inputs.

In further explanation, consider that the ordinates in FIGS. 2B and 2D represent the incremental deflection currents as indicated in parentheses. Also assume, for convenience, that there is a 1:1 relationship between ramp voltage amplitude and full scale deflection current. For vector A, ramp voltage $R_A$ will be multiplied by a factor or one-half to develop the $\Delta x$ and $\Delta y$ currents. This would yield respective currents as indicated at point 16. For vector B, ramp voltage $R_B$ will be multiplied by a factor of three-fourths to develop $\Delta x_B$ as indicated by point 17, and three-eights to develop the $\Delta y_B$ deflection current. For vector C, ramp voltage $R_C$ will be multiplied by a factor of one-sixteenth for $\Delta Y_C$ and one thirty-second for $\Delta x_C$. If a vector shorter than C were to be displayed, smaller fractions of $R_C$ would be selected by the corresponding D/A amplifiers.

The incremental currents will be added to the starting point currents to yield the displays shown in FIG. 2A. If, as is normally the case, the beam of the CRT is centered, suitable fixed displacement currents can be added as required. Also, for vectors extending in the negative direction of *x* and/or *y*, the incremental deflection currents can be reversed. These and other expedients are known in the art and need not be described in detail.

Figure 3:
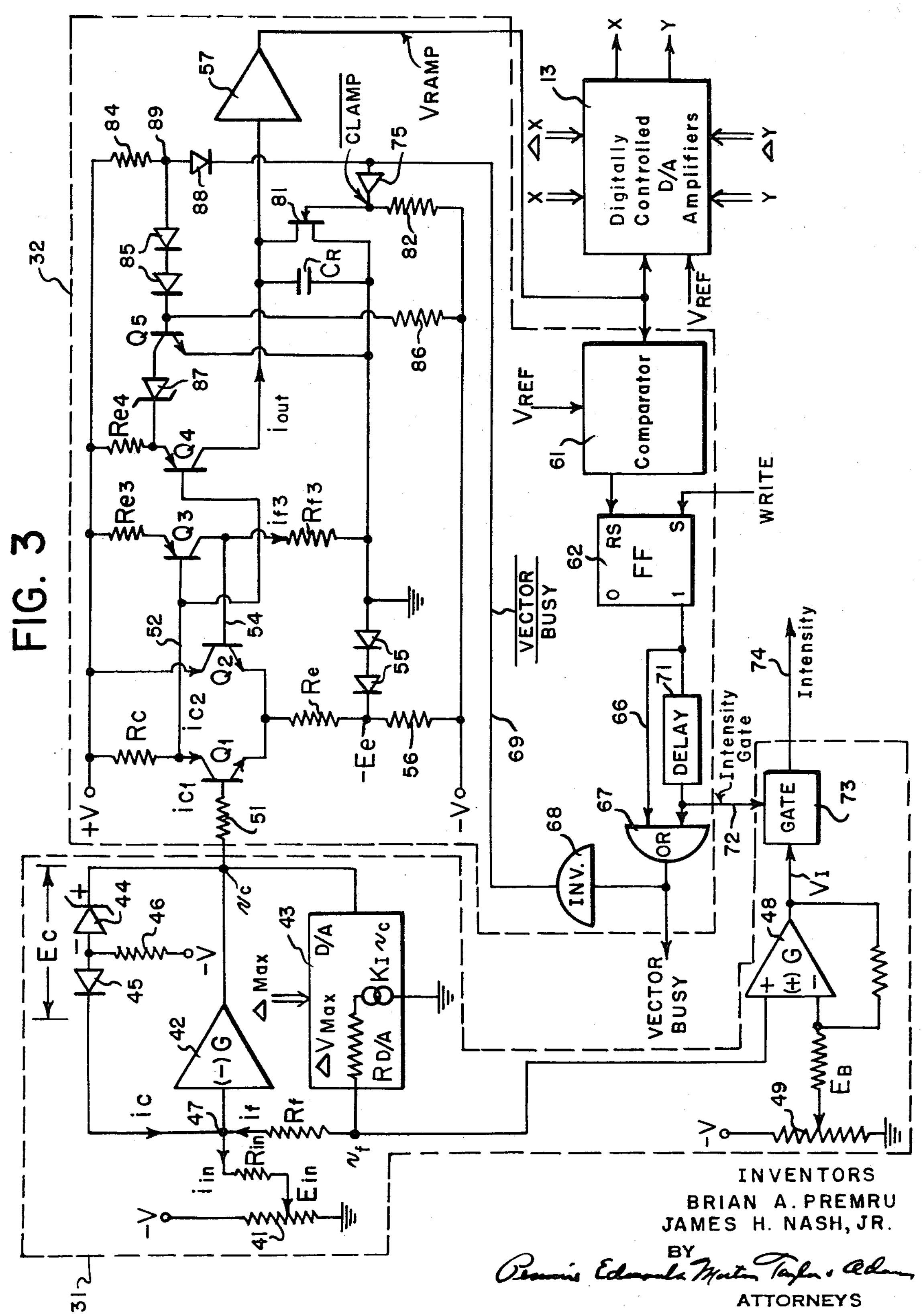
FIG. 3 is a schematic circuit diagram of the ramp generator and intensity control block of FIG. 1.

Referring to FIG. 3, the ramp generator and intensity control circuits of block 12 in FIG. 1 are shown. This may conveniently be considered as a ramp and intensity control voltage generator, designated by block 31, and a ramp generator controlled thereby, designated by block 32. Output signal $v_c$ from block 31 controls the ramp generation, and output signal $V_I$ controls the intensity. These signals are shown in FIGS. 4A and 4B, plotted against $K_I$. $K_I$ is the fraction of full scale deflection corresponding to Δ Max.

As seen in FIG. 4A, the voltage $v_c$ has a constant value of $E_c$ for small vectors, indicated at 33. For larger vectors, $v_c$ follows curve 34 which is proportional to the reciprocal of $K_I$. This corresponds to FIG. 2C, wherein the slopes of the ramp voltages are inversely proportional to their respective fractions of $T_{max}$. The value of curve 34 at $K_I = 1$ is denoted $-E_{in}$, and corresponds to the time $T_{max}$ selected for drawing a full scale vector.

FIG. 4B shows the intensity control signal $V_I$ plotted against $K_I$. In the proportional range where the writing speed is approximately constant, a uniform beam intensity suffices. In this range $V_I$ is constant, as shown at 35. However, in the constant time range for small vectors the writing speed changes markedly, and $V_I$ decreases linearly as the vectors become shorter, as shown at 36. The minimum value $E_B$ corresponds to a vector of zero length (a dot).

FIG. 6 shows the vector writing time, plotted against $K_I$. For very short vectors corresponding to small values of $K_I$, the writing time is constant, as indicated at 37. Above the transition point 38 between constant time and proportional time ranges, the writing time increases linearly as shown by the sloping line 39. As will be understood from the foregoing, the value of $K_I$ will be determined by Δ Max.

Referring back to FIG. 3, the generation of the ramp control voltage $v_c$ will be explained first. A constant input voltage $E_{in}$ is obtained from potentiometer 41, and is adjustable to produce a full scale sweep in the desired time $T_{max}$. $E_{in}$ is supplied through resistor $R_{in}$ to a high gain, polarity-inverting operational amplifier 42. Two feedback loops are provided from output to input.

One feedback loop includes a D/A attenuator 43 which is digitally controlled by Δ Max, say a 10-bit binary signal, to feed back a voltage equal to $K_I v_c$, as indicated in the box. For example, for a full length vector component in either *x* or *y* directions (or both), $K_I$ will be unity and the full value of the output signal $v_c$ will be fed back to the amplifier input. For a half-length vector component, $K_I$ will be one-half and the voltage fed back will be ½ $v_c$. The D/A attenuator will have an output impedance, denoted $R_{D/A}$, which is advantageously kept low. The resultant feedback voltage is denoted $v_f$, and is fed back to the input of amplifier 42 via resistor $R_f$. From conventional analysis, with an operational amplifier the value of $v_c$ in the proportional range 34 (FIG. 4A) can be shown to be:

$$v_c = -\left(\frac{E_{in}}{K_I}\right)\frac{R_f + R_{D/A}}{R_{in}} \qquad (1)$$

With $E_{in}$ set at the desired value and the resistor values chosen, $v_c$ is inversely proportional to $K_I$. Conveniently $R_f$ and $R_{in}$ may be made equal and $R_{D/A}$ kept small. Then $v_c$ is approximately $-E_{in}/K_I$.

The other feedback loop functions to limit the output voltage $v_c$ to a predetermined value $E_c$ for short vectors, and includes a bias source in opposition to $v_c$ for preventing feedback when the output is below the predetermined value and allowing feedback when the output reaches the predetermined value.

To this end, the second feedback loop includes a Zener diode 44 and a blocking diode 45 in series between the output and input. This loop is inactive during the proportional range of operation where the output voltage $v_c$ is below the Zener voltage. Diode 45 blocks any current flow from input to output under this condition. When, however, the output voltage $v_c$ reaches approximately the Zener voltage, current $i_c$ flows and prevents $v_c$ from rising higher. This can be explained by noting that the input terminal 47 of an operational amplifier is at virtual ground. Thus the output is held above ground by the amount $E_c$, as indicated at 33 in FIG. 4A.

The value of $E_c$ is primarily the voltage of the Zener diode, which can be considered to be a battery. However, the contact potential of diode 45 also affects the exact voltage at which current $i_c$ flows, and is included in $E_c$. As will be understood, the Zener diode 44 and diode 45 will form a low impedance feedback circuit when $i_c$ flows. Resistor 46, returned to −V, maintains a current flow through the Zener diode so as to avoid the knee of its characteristic.

The double loop feedback amplifier also supplies output $v_f$ for intensity control. In the proportional range of operation $i_c$ is zero and the input current to amplifier 42 is very small. Thus $i_{in} = i_f$ and voltage $v_f$ is a constant determined by $E_{in}$ and the magnitudes of resistors $R_{in}$ and $R_f$. Specifically:

$$v_f = -E_{in}\,(R_f/R_{in}) \qquad (2)$$

Conveniently the resistors are equal, and:

$$v_f = -E_{in} \qquad (3)$$

In the constant time range, $v_c$ is constant at the value $E_c$ and point 47 is at virtual ground. Consequently the current $i_f$ fed back through the lower loop is the fraction of $E_c$ selected by D/A attenuator 43 divided by the loop resistance, giving:

$$v_f = K_I\,E_c\,(R_f/R_f + R_{D/A}) \qquad (4)$$

With $R_{D/A}$ kept small, in the constant time range:

$$v_f = K_I E_c, \text{ approx.} \qquad (5)$$

The transition point between proportional and constant time ranges may be designated $K_I'$. From equations (3) and (5):

$$K_I' = -E_{in}/E_c \qquad (6)$$

Therefore, in the constant time range:

$$V_f = K_I/K_I'\,(-E_{in}) \qquad (7)$$

Inasmuch as the ramp control voltage and the intensity control voltage are developed by the same circuit, changes in circuit constants will change both voltages simultaneously so that proper relationships between the two are obtained automatically. For example, a change in $E_c$ will change the transition points for both voltages in like manner.

The intensity control voltage $v_f$ is supplied to a differential operational amplifier 48 along with an adjustable offset voltage $E_B$ from potentiometer 49, thereby yielding an output voltage $V_I$ as depicted in FIG. 4B. The subsequent gating will be described later.

Turning now to the production of the ramp voltage, $v_c$ is supplied to block 32 to produce a ramp voltage whose slope is controlled by $v_c$. The circuit including transistors $Q_1$, $Q_2$ and $Q_3$ is, broadly, a feedback amplifier designed to produce a current $i_{f3}$ in resistor $R_{f3}$ which is accurately proportional to the input voltage $v_c$.

Transistors $Q_1$ and $Q_2$, here shown as of the NPN type, have a common emitter resistor $R_e$, thus forming a differential amplifier. $Q_1$ has a collector load resistor $R_c$ and signal $v_c$ is applied to its base through resistor 51. The output of $Q_1$ is fed via line 52 to the base of $Q_3$, here shown as of type PNP. The emitter of $Q_3$ is connected through resistor $R_{e3}$ to +V, and its collector load $R_{f3}$ is returned to ground. The collector is also connected through line 54 to the base of $Q_2$ to provide feedback. As $v_c$ becomes more positive, line 52 becomes less positive, thereby increasing current $i_{f3}$ and driving the base of $Q_2$ more positive. Hence the potentials of the bases of $Q_1$ and $Q_2$ change in the same direction.

It is desired to have the potential of the base of $Q_2$ accurately follow that of $Q_1$, so that current through $R_{f3}$ will be accurately proportional to $v_c$. This requires that the ratio of collector currents $i_{c1}$ and $i_{c2}$ be maintained essentially constant. Current $i_{c1}$ increases with $v_c$ and, if the common emitter current were maintained constant, current $i_{c2}$ would decrease. This would produce a dynamic voltage offset between the transistor bases. To avoid such offset the common emitter circuit is designed so that, as $v_c$ increases, the sum of $i_{c1}$ and $i_{c2}$ increases to maintain the collector current ratio constant.

To this end, the resistor $R_e$ in the common emitter circuit is returned to a bias voltage $-E_e$ which is below the reference voltage (ground) for $v_c$ and the values of this bias voltage and of $R_e$ are selected so that the incremental current change in $R_e$ is essentially twice the incremental current change in $i_{c1}$ over the range of $v_c$. Then the current change in $i_{c2}$ will be equal to that in $i_{c1}$. The following design equations are helpful in the selection:

$$E_e = V_{BE}\left(\frac{2R_e}{R_c} + 1\right) \qquad (8)$$

$$R_e = \frac{R_{f3}}{2\left(\frac{R_{e3}}{R_c} + \frac{2}{\beta}\right)} \qquad (9)$$

where $V_{BE}$ is the base to emitter voltage drop in $Q_I$, $R_{e3}$ is the emitter resistor of $Q_3$ and $\beta$ is the DC current gain of $Q_3$, the emitter resistor and $\beta$ of $Q_4$ being the same as of $Q_3$.

In FIG. 3, $-E_e$ is obtained from the potential drop across the series diodes 55 connected to the −V line through resistor 56.

The capacitor $C_R$ is the ramp charging capacitor, and is charged with a current accurately proportional to $v_c$. To do this without affecting the operation of the feedback amplifier, transistor $Q_4$ has its base supplied from the same line 52 as $Q_3$. Both $Q_3$ and $Q_4$ are of the same type and may be matched if desired. The emitter resistors $R_{e3}$ and $R_{e4}$ are precision resistors of the same value. Consequently the collector current in $Q_4$, designated $i_{out}$, is equal to the collector current $i_{f3}$ of $Q_3$. By using the separate transistor $Q_4$ to provide the output current, the feedback loop is separate from the output circuit and the output circuit of $Q_4$ can be designed independently. Also, the collector circuit of $Q_4$ can take on a different voltage from the collector circuit of $Q_3$. Inasmuch as the emitter-collector current of $Q_4$ is substantially independent of its collector circuit within operating limits, the current therein will remain the same as that of $Q_3$.

The current $i_{out}$ charges capacitor $C_R$ to produce a ramp voltage which is buffered by amplifier 57 to produce $V_{RAMP}$. The latter is supplied to comparator 61 along with a reference voltage $V_{REF}$. When the ramp voltage equals the reference voltage, a signal from the comparator resets a suitable switch means, here shown as flip-flop (FF) 62. The ramp voltage is also supplied to D/A amplifiers 13 whose operation has already been described in connection with FIG. 1.

Before describing the ramp control in detail, reference will be made to FIG. 7. With an electromagnetically deflected CRT, there is a slight delay between the application of a voltage to the deflection coils and the start of the actual sweep. Also, there may be a slight delay between the generation of the ramp voltage and the production of the sweep waves. Accordingly, in this embodiment a delay is introduced between the development of the ramp voltage and the intensification of the CRT beam.

Referring to FIG. 7, line 63 shows the ramp voltage as applied to comparator 61, and line 64 shows the actual CRT sweep. The delay between the two slopes is designated D. The INTENSITY waveform 65 rises to intensify the CRT beam at the start of sweep 64. Inasmuch as the sweep 64 is delayed, the ramp voltage 63 continues during the delay period so as to continue to supply a rising voltage to the D/A amplifiers until the sweep 64 terminates. Thus ramp 63 rises somewhat above $V_{REF}$. Upon termination of sweep 64, the INTENSITY waveform drops to cut off the CRT beam.

FIG. 5 shows waveforms illustrating the control of ramp voltage generation, including the delay. Overall, start and stop signals are produced in response to an initiating signal designated WRITE and a signal from the comparator designated RESET. The start and stop signals are the changes in level of the FF62 output, designated FF "1." These signals also produce delayed start and delayed stop signals, represented by the changes in level of the INTENSITY GATE signal. The initial start signal is utilized to control the start of the ramp signal, and the delayed stop signal controls the stopping of the ramp, as illustrated by the VECTOR BUSY waveform. The manner in which these signals are produced and utilized in the specific embodiment will now be described.

Referring to FIGS. 3 and 5, the WRITE signal is developed by DPU 10 (FIG. 1) when data for a vector are ready to be used, and is applied to the "set" input S of FF62. The "1" output of FF62 goes high to produce a start signal, and is applied through line 66 to OR67 whose output thereupon goes high to produce the VECTOR BUSY signal. This signal is fed to the DPU for control purposes therein. The same signal is passed through inverter 68 to line 69 to form the signal termed $\overline{\text{VECTOR}}$ $\overline{\text{BUSY}}$.

A bi-directional delay circuit 71 also receives the "1" output of FF62 and is designed so that its output goes high a predetermined time after its input goes high, equal to the desired delay D in FIG. 7. Accordingly the INTENSITY GATE output in line 72 goes high after the delay D, and opens gate 73. This allows the gate to pass $V_I$ to initiate the INTENSITY signal in line 74 which controls the grid of the CRT display.

The $\overline{\text{VECTOR}}$ $\overline{\text{BUSY}}$ signal in line 69 is fed through a level-shifting amplifier 75 to form a $\overline{\text{CLAMP}}$ signal which controls a discharge circuit for the ramp capacitor. To this end, $\overline{\text{CLAMP}}$ is applied to the gate of a field-effect transistor (FET) 81 which has its source and drain terminals connected to respective plates of capacitor $C_R$, so that the FET shunts the capacitor. The gate is biased negatively by −V through resistor 82 so that the FET is biased beyond cutoff. Prior to the WRITE pulse, $\overline{\text{CLAMP}}$ is high and causes FET 81 to conduct strongly, thereby maintaining $C_R$ discharged. When $\overline{\text{CLAMP}}$ goes low, FET 81 becomes non-conducting and allows $C_R$ to be charged.

$\overline{\text{VECTOR}}$ $\overline{\text{BUSY}}$ is likewise high prior to the WRITE pulse and is applied to a circuit which controls $Q_4$. Transistor $Q_5$ has its emitter grounded and its base biased positively by a series circuit from +V to −V including resistor 84, diodes 85 and resistor 86, so that $Q_5$ is biased "on" to conduct. The collector of $Q_5$ is connected through Zener diode 87 to the emitter of $Q_4$ so that, with $Q_5$ on, the emitter potential of $Q_4$ is held below its base potential and $Q_4$ is cut off. With the circuit parameters used, the base potential of $Q_4$ is only a few volts below +V, and connecting the emitter to ground through $Q_5$ might exceed the allowable base to emitter voltage rating. Accordingly the Zener diode is inserted so that $Q_4$ is effectively cut off without exceeding its voltage rating. With $Q_4$ cut off, no charging current can flow to $C_R$. This avoids any zero offset voltage across $C_R$.

When $\overline{\text{VECTOR}}$ $\overline{\text{BUSY}}$ goes low upon occurrence of a WRITE pulse, diode 88 conducts and brings the voltage at point 89 down so that $Q_5$ is cut off. This allows the $Q_4$ base-to-emitter circuit to be forward biased and thus turns $Q_4$ on to start charging $C_R$.

It will be noted that the emitter-collector circuit of $Q_5$ is in shunt with the series circuit including the emitter-collector circuit of $Q_4$ and ramp capacitor $C_R$, and that the transistors are of opposite type. Since $Q_5$ is off when $Q_4$ is on, and vice versa, power supply current through $R_{e4}$ flows alternately through $Q_4$ and $Q_5$.

When the ramp voltage has reached the reference voltage in comparator 61 and FF62 is reset, as described before, the "1" output goes low, as shown in FIG. 5. Line 66 thereupon goes low. However, the output of delay circuit 71 remains high until the predetermined delay D has elapsed, and during this interval the output of OR67 remains high and $\overline{\text{VECTOR}}$ $\overline{\text{BUSY}}$ and $\overline{\text{CLAMP}}$ remain low. This allows the ramp voltage across $C_R$ to continue to rise, as illustrated by line 63 in FIG. 7, and the INTENSITY signal 65 remains high. After delay D, the output of delay circuit 71 goes low and the INTENSITY signal goes low to cut off the CRT beam. VECTOR BUSY goes low, thus informing the DPU that the desired vector has been drawn and the display is ready for another vector. $\overline{\text{CLAMP}}$ goes high to turn on FET 81 and short-circuit $C_R$, thereby terminating the ramp. The voltage across $C_R$ rapidly decays to ground, and the RESET output of comparator 61 rapidly rises, as indicated in FIG. 5. $\overline{\text{VECTOR}}$ $\overline{\text{BUSY}}$ likewise goes high and turns $Q_5$ on, thereby cutting off current from $Q_4$ to $C_R$.

If desired, in order to allow time for the next data processing in DPU 10 and any transients to settle down, to $\overline{\text{CLAMP}}$ signal could be held low for a brief interval by a suitable control signal from the DPU. This would hold the ramp voltage at a constant level, since further charging of $C_R$ by $Q_4$ will be prevented by $\overline{\text{VECTOR}}$ $\overline{\text{BUSY}}$.

We claim:

1. Apparatus for producing constant-amplitude variable-slope ramp signals and an intensity control signal in response to digital data which comprises a. an amplifier, b. input means for supplying a signal of constant value to the input of said amplifier, c. a feedback circuit for said amplifier including a digital-to-analog attenuator responsive to said digital data to produce a feedback signal to the input of the amplifier which is proportional to a fraction of the amplifier output signal whereby the amplifier output increases as said fraction decreases, d. limiting means for limiting said amplifier output to a predetermined value for small fractional outputs of said attenuator, e. ramp generator means for utilizing the output of said amplifier to produce ramp signals having slopes varying in accordance with the amplifier output, f. comparator means for comparing said ramp signals with a reference to produce signals for terminating the ramp signals, g. and means for utilizing the output of said digital-to-analog attenuator to produce an intensity control signal varying with the attenuator output in the region of said limiting.

2. Apparatus in accordance with claim 1 in which said limiting means is a feedback circuit from the output to the input of said amplifier which includes a bias source in opposition to the amplifier output for preventing feedback when the output is below a predetermined value and allowing feedback when the output reaches said predetermined value.

3. Apparatus in accordance with claim 1 in which said amplifier is an operational amplifier, said input means includes a source of voltage and a series input resistor, said feedback circuit includes a series resistor between said attenuator and the amplifier input, and said limiting means is a feedback circuit from the output to the input of the amplifier which includes a series Zener diode and series blocking diode allowing feedback when the amplifier output reaches a predetermined value and preventing feedback therebelow.

4. Apparatus in accordance with claim 1 in which said ramp generator means includes a. first and second transistors connected as a differential amplifier, b. said amplifier output being supplied to the input of said first transistor, c. third and fourth transistors having like characteristics and like base-emitter input circuits and each having a collector output circuit, d. means for supplying the output of said first transistor to the input circuits of said third and fourth transistors, e. means for supplying the output of said third transistor to the input of said second transistor to form a feedback circuit whereby the collector output currents of the third and fourth transistors are each proportional to the input signal to the first transistor, f. a ramp capacitor, g. and means for supplying the output of said fourth transistor to said ramp capacitor to produce a ramp signal thereacross.

5. Apparatus in accordance with claim 4 in which said inputs to the first and second transistors are to the bases thereof and said output of the first transistor is from the collector thereof, said first and second transistors having a common emitter circuit including an emitter series resistance and a source of emitter bias predetermined to yield an incremental current change in said emitter series resistance which is substantially twice the incremental collector current change in said first transistor over the input range of the first transistor.

6. Apparatus in accordance with claim 1 utilizing initiating signals for initiating said ramp signals, and including a. switch means responsive to said initiating signals and to said signals from the comparator means for producing alternative start and stop signals, b. means for supplying said start signals to said ramp generator means for controlling the initiation of said ramp signals, c. delay means supplied with said start and stop signals for producing delayed start and delayed stop signals, d. means for supplying said delayed stop signals to said ramp generator means for controlling the stopping of said ramp signals, e. and means for utilizing said delayed start and delayed stop signals for gating said intensity control signal.

7. Apparatus in accordance with claim 4 utilizing initiating signals for initiating said ramp signals and in which said ramp capacitor and the emitter-collector circuit of said fourth transistor forms a series circuit, and including a. a discharge circuit for said ramp capacitor, b. a fifth transistor having an emitter-collector circuit connected in shunt with said series circuit for alternately turning said fourth transistor on and off when the fifth transistor is respectively off and on, c. switch means responsive to said initiating signals and to said signals from the comparator means for producing alternative start and stop signals, d. means for supplying said start signals to said discharge circuit and said fifth transistor to disable the discharge circuit and turn the fifth transistor off, e. delay means supplied with said start and stop signals for producing delayed start and delayed stop signals, f. means for supplying said delayed stop signals to said discharge circuit and said fifth transistor to enable the discharge circuit and turn the fifth transistor on, g. and means for utilizing said delayed start and delayed stop signals for gating said intensity control signal.

8. Apparatus in accordance with claim 1 for producing deflection and intensity control signals to draw vectors on a cathode-ray tube display including a. a digital data source for supplying $\Delta$ X and $\Delta$ Y digital data for a vector and $\Delta$ Max digital data corresponding to the greater in magnitude of $\Delta$ X and $\Delta$ Y, b. said $\Delta$ Max digital data being supplied to said digital-to-analog attenuator, c. means for utilizing said ramp signals and said $\Delta$ X and $\Delta$ Y digital data to produce respective $\Delta$ X and $\Delta$ Y deflection signals for said cathode-ray tube display, d. and means for utilizing said intensity control signal to control the intensity of said cathode-ray tube display.

9. Apparatus in accordance with claim 8 in which said amplifier is an operational amplifier, said input means includes a source of voltage and a series input resistor, said feedback circuit includes a series resistor between said attenuator and the amplifier input, and said limiting means is a feedback circuit from the output to the input of the amplifier which includes a series biased Zener diode and series blocking diode allowing feedback when the amplifier output reaches a predetermined value and preventing feedback therebelow.

10. Apparatus in accordance with claim 9 in which said ramp generator means includes a. first and second transistors connected as differential amplifier,
b. said amplifier output being supplied to the input of said first transistor,
c. third and fourth transistors having like characteristics and like base-emitter input circuits and each having a collector output circuit,
d. means for supplying the output of said first transistor to the input circuits of said third and fourth transistors,
e. means for supplying the output of said third transistor to the input of said second transistor to form a feedback circuit whereby the collector output currents of the third and fourth transistors are each proportional to the input signal to the first transistor,
f. a ramp capacitor,
g. and means for supplying the output of said fourth transistor to said ramp capacitor to produce a ramp signal thereacross.

11. Apparatus in accordance with claim 10 in which said inputs to the first and second transistors are to the bases thereof and said output of the first transistor is from the collector thereof, said first and second transistors having a common emitter circuit including an emitter series resistance and a source of emitter bias predetermined to yield an incremental current change in said emitter series resistance which is substantially twice the incremental collector current change in said first transistor over the input range of the first transistor.

12. Apparatus in accordance with claim 8 utilizing initiating signals for initiating said ramp signals, and including a. switch means responsive to said initiating signals and to said signals from the comparator means for producing alternative start and stop signals,
b. means for supplying said start signals to said ramp generator means for controlling the initiation of said ramp signals,
c. delay means supplied with said start and stop signals for producing delayed start and delayed stop signals,
d. means for supplying said delayed stop signals to said ramp generator means for controlling the stopping of said ramp signals,
e. and means for utilizing said delayed start and delayed stop signals for gating said intensity control signal.

13. Apparatus in accordance with claim 10 utilizing initiating signals for initiating said ramp signals and in which said ramp capacitor and the emitter-collector circuit of said fourth transistor forms a series circuit, and including a. a discharge circuit for said ramp capacitor,
b. a fifth transistor having an emitter-collector circuit connected in shunt with said series circuit for alternately turning said fourth transistor on and off when the fifth transistor is respectively off and on,
c. switch means responsive to said initiating signals and to said signals from the comparator means for producing alternative start and stop signals,
d. means for supplying said start signals to said discharge circuit and said fifth transistor to disable the discharge circuit and turn the fifth transistor off,
e. delay means supplied with said start and stop signals for producing delayed start and delayed stop signals,
f. means for supplying said delayed stop signals to said discharge circuit and said fifth transistor to enable the discharge circuit and turn the fifth transistor on,
g. and means for utilizing said delayed start and delayed stop signals for gating said intensity control signal.

* * * * *